United States Patent
Hsu et al.

(10) Patent No.: US 10,354,112 B2
(45) Date of Patent: Jul. 16, 2019

(54) FINGERPRINT IDENTIFICATION MODULE AND MOBILE ELECTRONIC DEVICE WITH SAME

(71) Applicant: Primax Electronics Ltd., Taipei (TW)

(72) Inventors: Mao-Hsiu Hsu, Taipei (TW); Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 282 days.

(21) Appl. No.: 15/421,880

(22) Filed: Feb. 1, 2017

(65) Prior Publication Data

US 2018/0150672 A1 May 31, 2018

(30) Foreign Application Priority Data

Nov. 25, 2016 (TW) .............................. 105138916 A

(51) Int. Cl.
| | |
|---|---|
| *G06F 9/00* | (2006.01) |
| *G06K 9/00* | (2006.01) |
| *H04L 29/06* | (2006.01) |
| *H04W 12/06* | (2009.01) |
| *H05K 1/02* | (2006.01) |
| *H05K 1/18* | (2006.01) |

(52) U.S. Cl.
CPC ..... *G06K 9/00013* (2013.01); *G06K 9/00087* (2013.01); *H04L 63/0861* (2013.01); *H04W 12/06* (2013.01); *H05K 1/0212* (2013.01); *H05K 1/181* (2013.01); *H05K 2201/0129* (2013.01); *H05K 2201/0166* (2013.01); *H05K 2201/10151* (2013.01); *Y02P 70/611* (2015.11)

(58) Field of Classification Search
CPC ............ G06K 9/00013; G06K 9/00087; H04L 63/0861; H04W 12/06; H05K 1/0212; H05K 1/181; H05K 2201/0129; H05K 2201/0166; H05K 2201/10151; Y02P 70/611
See application file for complete search history.

(56) References Cited

U.S. PATENT DOCUMENTS

| | | | |
|---|---|---|---|
| 2015/0261261 A1* | 9/2015 | Bhagavatula | ......... G06F 1/1684 361/679.56 |
| 2016/0330182 A1* | 11/2016 | Jeon | ...................... H04L 63/062 |

OTHER PUBLICATIONS

Yang, Wen, et al. "Advanced shape memory technology to reshape product design, manufacturing and recycling." Polymers 6.8 (2014): 2287-2308. (Year: 2014).*

* cited by examiner

*Primary Examiner* — Nirav G Patel

(74) *Attorney, Agent, or Firm* — Muncy, Geissler, Olds & Lowe, P.C.

(57) ABSTRACT

A fingerprint identification module is provided for identifying a fingerprint of a finger. The fingerprint identification module includes a sensing chip and a thermally deformable layer. The thermally deformable layer is disposed over the sensing chip and includes a sensing region. When the finger is placed on the sensing region, the fingerprint of the finger is sensed by the sensing chip. If the fingerprint identification result of the fingerprint identification module fails, the thermally deformable layer is firstly changed to a molten state and then returned to a solidified state within a predetermined time period. Consequently, the finger is fixed by the thermally deformable layer.

9 Claims, 4 Drawing Sheets

FINGERPRINT IDENTIFICATION MODULE AND MOBILE ELECTRONIC DEVICE WITH SAME

FIELD OF THE INVENTION

The present invention relates to a fingerprint identification module, and more particularly to an anti-theft fingerprint identification module.

BACKGROUND OF THE INVENTION

Smart phones are indispensable devices for modern people. Since smart phones have high values, the smart phones are usually the targets of the thieves. Conventionally, the smart phone has an anti-theft function. If the smart phone is lost and the person who picks up the smart phone tries to unlock the smart phone, the anti-theft function secures the smart phone. For example, if the identification process fails, the smart phone is automatically locked and unable to be operated. However, the conventional anti-theft function is not helpful for the user to retrieve the smart phone and warn the thief. In other words, the anti-theft function of the conventional smart phone needs to be further improved.

SUMMARY OF THE INVENTION

The present invention provides a fingerprint identification module. When an unauthorized person presses the fingerprint identification module to input a fingerprint to unlock the fingerprint identification module, the fingerprint identification module is subjected to deformation so as to fix the finger of the unauthorized person.

The present invention provides a mobile electronic device with a fingerprint identification module. When an unauthorized person presses the fingerprint identification module to input a fingerprint to unlock the fingerprint identification module, the fingerprint identification module is subjected to deformation so as to fix the finger of the unauthorized person. At the same time, the mobile electronic device issues a GPS signal to a cloud data center.

In accordance with an aspect of the present invention, there is provided a fingerprint identification module for identifying a fingerprint of a finger. The fingerprint identification module includes a circuit board, a sensing chip, a thermally deformable layer and a temperature control module. The sensing chip is disposed on the circuit board and electrically connected with the circuit board. After the sensing chip senses the fingerprint, the sensing chip generates a fingerprint feature information and transmits the fingerprint feature information to a microprocessor, and the fingerprint feature information is compared with a fingerprint data in a storage memory by the microprocessor. The thermally deformable layer is disposed over the sensing chip and includes a sensing region. When the finger is placed on the sensing region, the fingerprint of the finger is sensed by the sensing chip. If a temperature of the thermally deformable layer is higher than a predetermined temperature, the thermally deformable layer is in a molten state. If the temperature of the thermally deformable layer is lower than the predetermined temperature, the thermally deformable layer is in a solidified state. The temperature control module is arranged beside the thermally deformable layer. The temperature control module receives a comparing result data from the microprocessor and controls the temperature of the thermally deformable layer according to the comparing result data. Before the comparing result data is received by the temperature control module, the temperature of the thermally deformable layer is lower than the predetermined temperature under control of the temperature control module. If the comparing result data received by the temperature control module indicates a successful identification result, the temperature of the thermally deformable layer is maintained at a temperature lower than the predetermined temperature. If the comparing result data received by the temperature control module indicates a failed identification result, the temperature control module increases the temperature of the thermally deformable layer to a temperature higher than the predetermined temperature and then decreases the temperature of the thermally deformable layer to a temperature lower than the predetermined temperature within a predetermined time period. Consequently, the thermally deformable layer is firstly changed to the molten state and then returned to the solidified state to fix the finger.

In an embodiment, the sensing chip and the temperature control module are arranged side by side and disposed on the circuit board, and the sensing chip and the temperature control module are electrically connected with the circuit board.

In an embodiment, the thermally deformable layer is coated on a top surface of the temperature control module.

In an embodiment, the temperature control module includes a heater and a cooling chip. If the comparing result data received by the temperature control module indicates the failed identification result, the heater is firstly enabled to heat the thermally deformable layer and then the heater is disabled and the cooling chip is enabled to cool the thermally deformable layer within the predetermined time period.

In an embodiment, the thermally deformable layer is made of a shape-memory polymeric composite material.

In an embodiment, the predetermined temperature is in a range between 40 and 200° C.

In accordance with another aspect of the present invention, there is provided a mobile electronic device. The mobile electronic device includes a fingerprint identification module and a global positioning system module. The fingerprint identification module is used for identifying a fingerprint of a finger. The global positioning system module is in communication with the microprocessor. The fingerprint identification module includes a circuit board, a sensing chip, a thermally deformable layer and a temperature control module. The sensing chip is disposed on the circuit board and electrically connected with the circuit board. After the sensing chip senses the fingerprint, the sensing chip generates a fingerprint feature information and transmits the fingerprint feature information to a microprocessor, and the fingerprint feature information is compared with a fingerprint data in a storage memory by the microprocessor. The thermally deformable layer is disposed over the sensing chip and includes a sensing region. When the finger is placed on the sensing region, the fingerprint of the finger is sensed by the sensing chip. If a temperature of the thermally deformable layer is higher than a predetermined temperature, the thermally deformable layer is in a molten state. If the temperature of the thermally deformable layer is lower than the predetermined temperature, the thermally deformable layer is in a solidified state. The temperature control module is arranged beside the thermally deformable layer. The temperature control module receives a comparing result data from the microprocessor and controls the temperature of the thermally deformable layer according to the comparing result data. Before the comparing result data is received by the temperature control module, the temperature of the thermally deformable layer is lower than the predetermined temperature under control of the temperature control module. If the comparing result data received by the temperature control module indicates a successful identification result, the temperature of the thermally deformable layer is maintained at a temperature lower than the predetermined temperature. If the comparing result data received by the temperature control module indicates a failed identification result, the temperature control module increases the temperature of the thermally deformable layer to a temperature higher than the predetermined temperature and then decreases the temperature of the thermally deformable layer to a temperature lower than the predetermined temperature within a predetermined time period. Consequently, the thermally deformable layer is firstly changed to the molten state and then returned to the solidified state to fix the finger.

In an embodiment, the temperature control module includes a heater and a cooling chip. If the comparing result data received by the temperature control module indicates the failed identification result, the heater is firstly enabled to heat the thermally deformable layer and then the heater is disabled and the cooling chip is enabled to cool the thermally deformable layer within the predetermined time period.

In an embodiment, when a releasing command from the cloud data center is received by the fingerprint identification module, the heater of the temperature control module is enabled to heat the thermally deformable layer, so that the thermally deformable layer is in the molten state.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
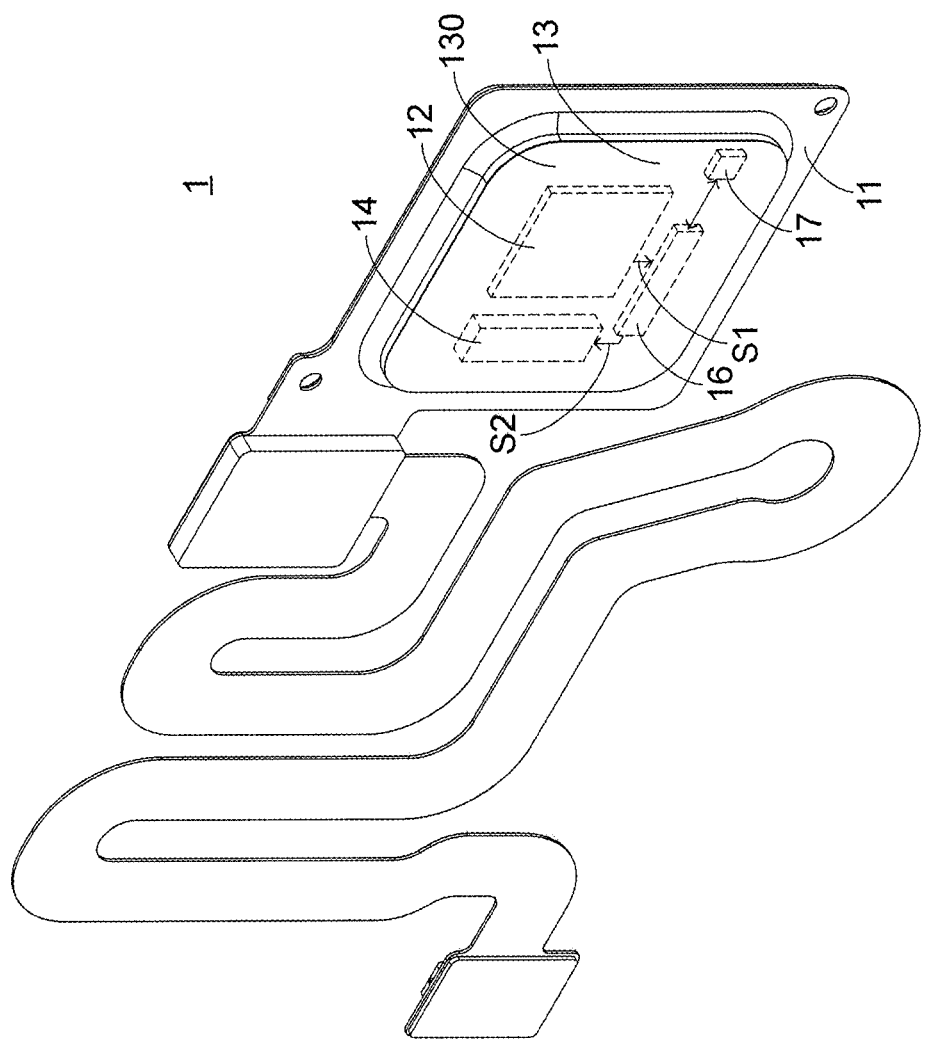
FIG. 1 is a schematic perspective view illustrating a fingerprint identification module according to an embodiment of the present invention.
Figure 2:
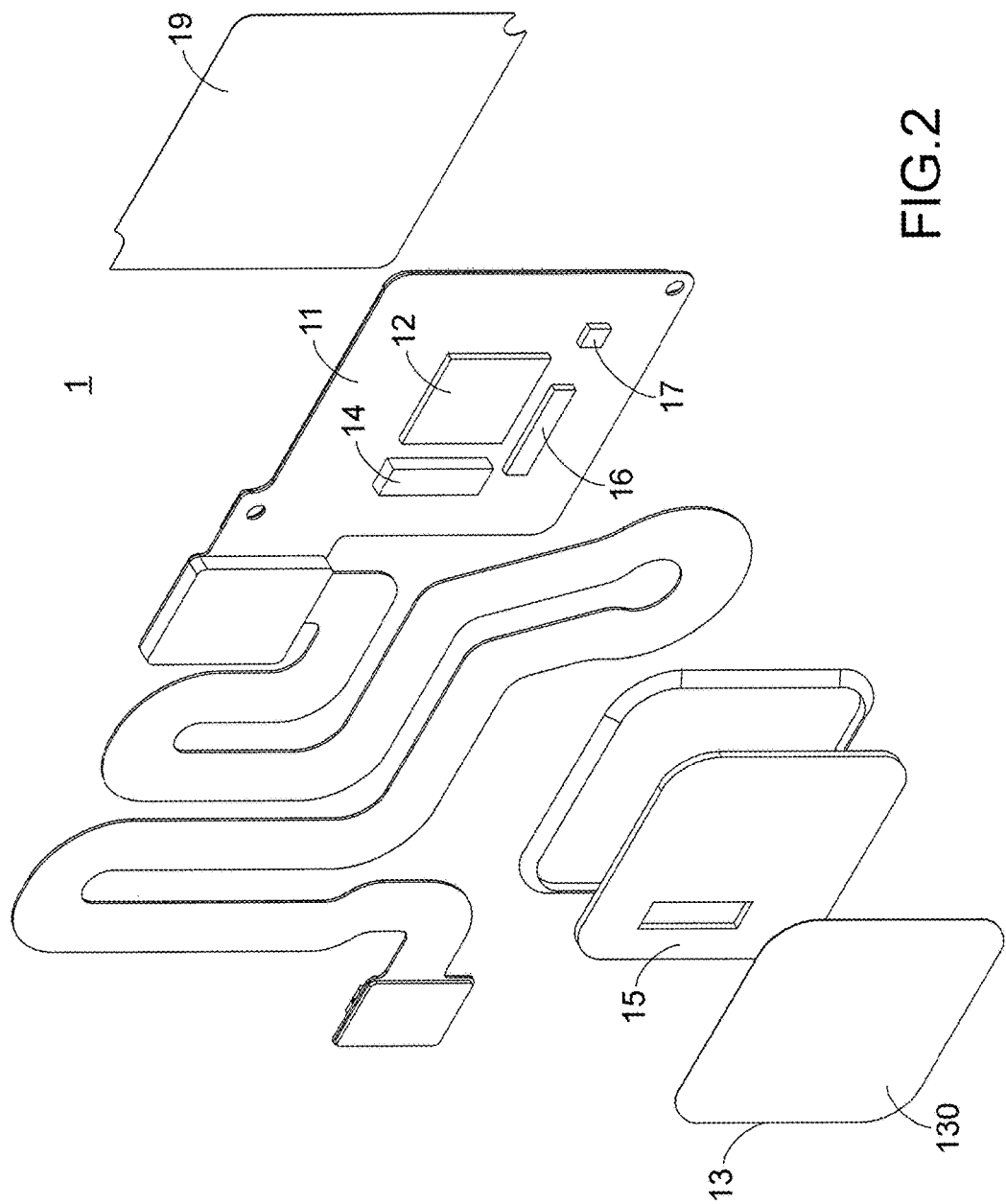
FIG. 2 is a schematic exploded view illustrating the fingerprint identification module according to the embodiment of the present invention.
Figure 3:
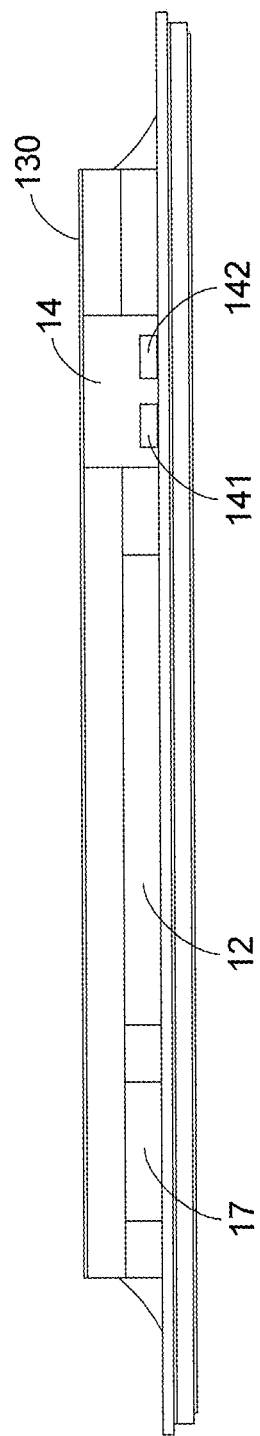
FIG. 3 is a schematic cross-sectional view illustrating a portion of the fingerprint identification module according to the embodiment of the present invention.

Please refer to FIGS. 1, 2 and 3. FIG. 1 is a schematic perspective view illustrating a fingerprint identification module according to an embodiment of the present invention. FIG. 2 is a schematic exploded view illustrating the fingerprint identification module according to the embodiment of the present invention. FIG. 3 is a schematic cross-sectional view illustrating a portion of the fingerprint identification module according to the embodiment of the present invention. The fingerprint identification module 1 is used for identifying a fingerprint of a finger. The fingerprint identification module 1 comprises a circuit board 11, a sensing chip 12, a thermally deformable layer 13 and a temperature control module 14. The sensing chip 12 and the temperature control module 14 are arranged side by side and disposed on the circuit board 11. Moreover, the sensing chip 12 and the temperature control module 14 are electrically connected with the circuit board 11. The temperature control module 14 is arranged near the thermally deformable layer 13. More preferably, the temperature control module 14 is contacted with the thermally deformable layer 13. Consequently, the heat generated by the temperature control module 14 can be transferred to the thermally deformable layer 13 quickly. The sensing chip 12 and the temperature control module 14 are encapsulated by a package layer 15. Moreover, the thermally deformable layer 13 is disposed over the package layer 15.

The thermally deformable layer 13 is coated on a top surface of the temperature control module 14 and a top surface of the package layer 15, and exposed outside. The thermally deformable layer 13 has a sensing region 130. The sensing region 130 is located at the top surface of the thermally deformable layer 13. When the finger is placed on the sensing region 130, the fingerprint of the finger can be sensed by the sensing chip 12.

When the fingerprint of the finger on the sensing region 130 is sensed by the sensing chip 12, a fingerprint feature information S1 is generated. Then, the fingerprint feature information S1 is transmitted to a microprocessor 16 for comparison. After comparison, the microprocessor 16 generates a comparing result data S2. After the comparing result data S2 from the microprocessor 16 is received by the temperature control module 14, the temperature control module 14 control the temperature of the thermally deformable layer 13 according to the comparing result data S2. In an embodiment, the fingerprint identification module 1 comprises the microprocessor 16 and a storage memory 17. A fingerprint data (not shown) is stored in the storage memory 17. By comparing the fingerprint feature information S1 with the fingerprint data, the microprocessor 16 generates the comparing result data S2. Preferably but not exclusively, either a microcontroller that is built in the fingerprint identification module 1 or a central processing unit that is not built in the fingerprint identification module 1 can be used as the microprocessor 16.

Before the comparing result data S2 is received by the temperature control module 14, the thermally deformable layer 13 is not heated or cooled by the temperature control module 14. Under this circumstance, the thermally deformable layer 13 is substantially at room temperature (or a normal temperature), which is lower than a predetermined temperature. Consequently, the thermally deformable layer 13 is not subjected to deformation. If the temperature of the thermally deformable layer 13 is higher than the predetermined temperature, the thermally deformable layer 13 is in a molten state. If the temperature of the thermally deformable layer 13 is lower than the predetermined temperature, the thermally deformable layer 13 is in a solidified state. The operating principles will be described as follows. The thermally deformable layer 13 is made of a composition containing two materials. These two materials have different deformation extents at the same temperature. If the temperature is higher than the predetermined temperature, a portion of polymeric crystallization of the thermally deformable layer 13 is molten and subjected to deformation. After cooled, the thermally deformable layer 13 is returned to the stable crystallized state and hardened. Consequently, the thermally deformable layer 13 has fixing capability. If the thermally deformable layer 13 is heated again, the polymeric crystallization is molten again and the fixing capability is lost.

In an embodiment, the temperature control module 14 comprises a heater 141 and a cooling chip 142. If the comparing result data S2 received by the temperature control module 14 indicates a successful identification result, the temperature of the thermally deformable layer 13 is not increased or decreased by the temperature control module 14. Meanwhile, the temperature of the thermally deformable layer 13 is maintained at the room temperature. If the comparing result data S2 received by the temperature control module 14 indicates a failed identification result, the heater 141 is firstly enabled to heat the thermally deformable layer 13, and then the heater 141 is disabled and the cooling chip 142 is enabled to cool the thermally deformable layer 13. The process of enabling the heater 141, disabling the heater 141 and enabling the cooling chip 142 is performed within a predetermined time period. For example but not exclusively, the predetermined time period is five seconds. That is, within the predetermined time period, the temperature control module 14 increases the temperature of the thermally deformable layer 13 to a temperature higher than the predetermined temperature and then decreases the temperature of the thermally deformable layer 13 to a temperature lower than the predetermined temperature. Consequently, the thermally deformable layer 13 is firstly changed to the molten state and then returned to the solidified state. If the finger is not separated from the thermally deformable layer 13 within the predetermined time period, the thermally deformable layer 13 is solidified to fix the finger.

In an embodiment, the thermally deformable layer 13 is made of a shape-memory polymeric composite material, and the predetermined temperature is in a range between 40 and 200° C. In this context, the term "deformation" used herein indicates the physical shape change or the chemical phase change.

Moreover, the fingerprint identification module 1 further comprises a structure reinforcement plate 19. The structure reinforcement plate 19 is disposed under the circuit board 11. The circuit board 11 and the structure reinforcement plate 19 are combined together through an adhesive. Consequently, the overall structural strength of the fingerprint identification module 1 is increased. When the fingerprint identification module 1 is pressed to be unlocked, the components of the fingerprint identification module 1 are not easily subjected to deformation or detached.

Figure 4:
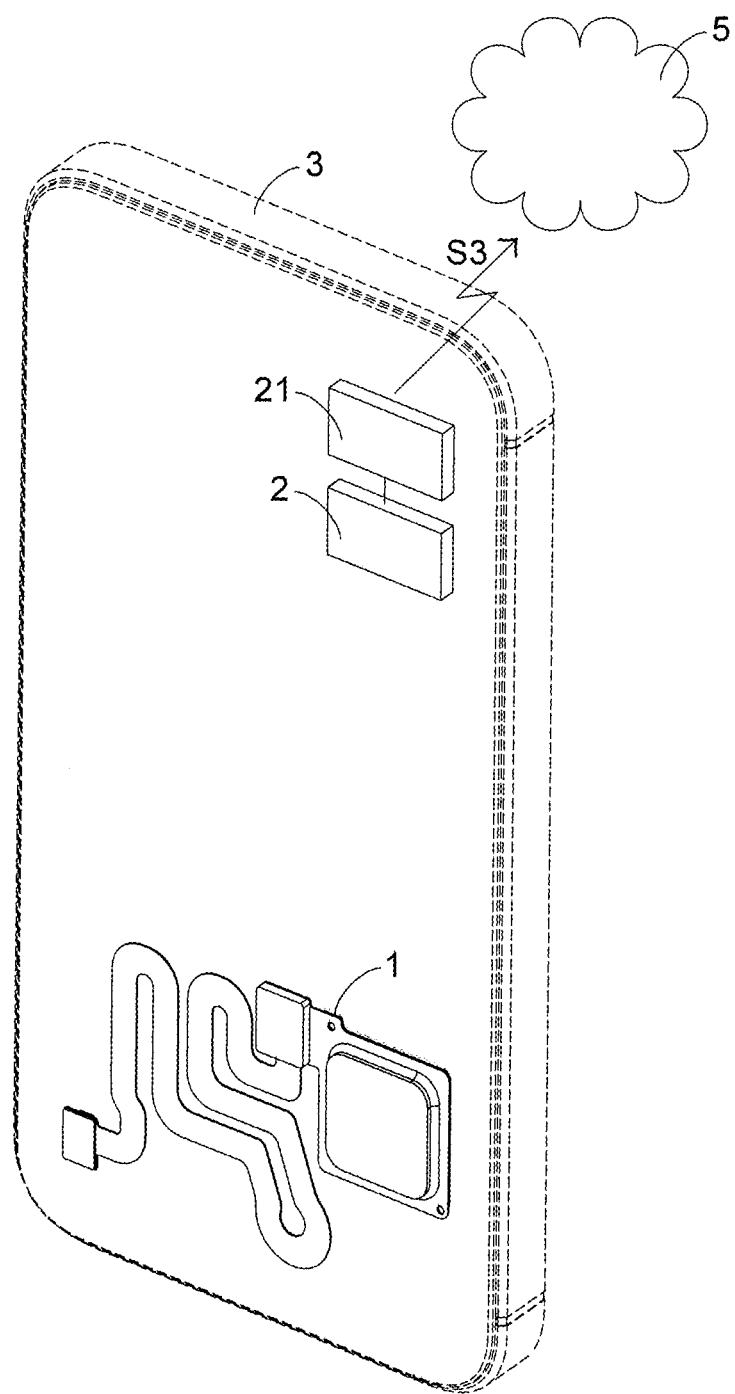
FIG. 4 is a schematic perspective view illustrating a mobile electronic device with the fingerprint identification module according to the embodiment of the present invention.

FIG. 4 is a schematic perspective view illustrating a mobile electronic device with the fingerprint identification module according to the embodiment of the present invention. As shown in FIG. 4, the mobile electronic device 3 comprises the fingerprint identification module 1 and a global positioning system module 2.

If the comparing result data S2 received by the temperature control module 14 indicates the failed identification result, it means that the person who intends to unlock the mobile electronic device 3 is not authorized. That is, the person who intends to unlock the mobile electronic device 3 is possibly a thief. As mentioned above, the thermally deformable layer 13 is firstly changed to the molten state and then returned to the solidified state under control of the temperature control module 14. Consequently, the finger of the person who intends to unlock the mobile electronic device 3 is fixed on the thermally deformable layer 13. Especially, the global positioning system module 2 issues a positioning signal S3 to a cloud data center 5 to reveal the location of the person who intends to unlock the mobile electronic device 3. At the same time, the fingerprint of the finger of the person who intends to unlock the mobile electronic device 3 is synchronously copied and transmitted to the cloud data center 5. For releasing the fixed finger, an identity authentication process is needed. That is, the identity data is transmitted to the cloud data center 5. If the identity authentication process indicates that the identity is authenticated, the cloud data center 5 issues a releasing command to the mobile electronic device 3. In response to the releasing command, the temperature control module 14 increases the temperature of the thermally deformable layer 13. Consequently, the finger is no longer fixed by the thermally deformable layer 13.

From the above descriptions, the fingerprint identification module of the present invention comprises the temperature control module and the thermally deformable layer. If the fingerprint identification result fails, the person who intends to unlock the mobile electronic device is fixed by the thermally deformable layer. Consequently, the anti-theft efficacy is achieved. When the fingerprint identification module is installed on the mobile electronic device, the fingerprint identification module can fix the finger of the person who intends to unlock the mobile electronic device. Moreover, the mobile electronic device issues a positioning signal to reveal the location of the person who intends to unlock the mobile electronic device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint identification module for identifying a fingerprint of a finger, the fingerprint identification module comprising:

a circuit board;

a sensing chip disposed on the circuit board and electrically connected with the circuit board, wherein after the sensing chip senses the fingerprint, the sensing chip generates a fingerprint feature information and transmits the fingerprint feature information to a microprocessor, and the fingerprint feature information is compared with a fingerprint data in a storage memory by the microprocessor;

a thermally deformable layer disposed over the sensing chip and comprising a sensing region, wherein when the finger is placed on the sensing region, the fingerprint of the finger is sensed by the sensing chip, wherein if a temperature of the thermally deformable layer is higher than a predetermined temperature, the thermally deformable layer is in a molten state, wherein if the temperature of the thermally deformable layer is lower than the predetermined temperature, the thermally deformable layer is in a solidified state; and a temperature control module arranged beside the thermally deformable layer, wherein the temperature control module receives a comparing result data from the microprocessor and controls the temperature of the thermally deformable layer according to the comparing result data, wherein before the comparing result data is received by the temperature control module, the temperature of the thermally deformable layer is lower than the predetermined temperature under control of the temperature control module, wherein if the comparing result data received by the temperature control module indicates a successful identification result, the temperature of the thermally deformable layer is maintained at a temperature lower than the predetermined temperature, wherein if the comparing result data received by the temperature control module indicates a failed identification result, the temperature control module increases the temperature of the thermally deformable layer to a temperature higher than the predetermined temperature and then decreases the temperature of the thermally deformable layer to a temperature lower than the predetermined temperature within a predetermined time period, so that the thermally deformable layer is firstly changed to the molten state and then returned to the solidified state to fix the finger.

2. The fingerprint identification module according to claim 1, wherein the sensing chip and the temperature control module are arranged side by side and disposed on the circuit board, and the sensing chip and the temperature control module are electrically connected with the circuit board.

3. The fingerprint identification module according to claim 2, wherein the thermally deformable layer is coated on a top surface of the temperature control module.

4. The fingerprint identification module according to claim 1, wherein the temperature control module comprises a heater and a cooling chip, wherein if the comparing result data received by the temperature control module indicates the failed identification result, the heater is firstly enabled to heat the thermally deformable layer and then the heater is disabled and the cooling chip is enabled to cool the thermally deformable layer within the predetermined time period.

5. The fingerprint identification module according to claim 1, wherein the thermally deformable layer is made of a shape-memory polymeric composite material.

6. The fingerprint identification module according to claim 1, wherein the predetermined temperature is in a range between 40 and 200° C.

7. A mobile electronic device with a fingerprint identification module, the mobile electronic device comprising:
the fingerprint identification module for identifying a fingerprint of a finger, wherein the fingerprint identification module comprises:
a circuit board;
a sensing chip disposed on the circuit board and electrically connected with the circuit board, wherein after the sensing chip senses the fingerprint, the sensing chip generates a fingerprint feature information and transmits the fingerprint feature information to a microprocessor, and the fingerprint feature information is compared with a fingerprint data in a storage memory by the microprocessor;
a thermally deformable layer disposed over the sensing chip and comprising a sensing region, wherein when the finger is placed on the sensing region, the fingerprint of the finger is sensed by the sensing chip, wherein if a temperature of the thermally deformable layer is higher than a predetermined temperature, the thermally deformable layer is in a molten state, wherein if the temperature of the thermally deformable layer is lower than the predetermined temperature, the thermally deformable layer is in a solidified state; and
a temperature control module arranged beside the thermally deformable layer, wherein the temperature control module receives a comparing result data from the microprocessor and controls the temperature of the thermally deformable layer according to the comparing result data, wherein before the comparing result data is received by the temperature control module, the temperature of the thermally deformable layer is lower than the predetermined temperature under control of the temperature control module,
a global positioning system module in communication with the microprocessor,
wherein if the comparing result data received by the temperature control module indicates a successful identification result, the temperature of the thermally deformable layer is maintained at a temperature lower than the predetermined temperature, wherein if the comparing result data received by the temperature control module indicates a failed identification result, the global positioning system module issues a positioning signal to a cloud data center, and the temperature control module increases the temperature of the thermally deformable layer to a temperature higher than the predetermined temperature and then decreases the temperature of the thermally deformable layer to a temperature lower than the predetermined temperature within a predetermined time period, so that the thermally deformable layer is firstly changed to the molten state and then returned to the solidified state to fix the finger.

8. The mobile electronic device according to claim 7, wherein the temperature control module comprises a heater and a cooling chip, wherein if the comparing result data received by the temperature control module indicates the failed identification result, the heater is firstly enabled to heat the thermally deformable layer and then the heater is disabled and the cooling chip is enabled to cool the thermally deformable layer within the predetermined time period.

9. The mobile electronic device according to claim 8, wherein when a releasing command from the cloud data center is received by the fingerprint identification module, the heater of the temperature control module is enabled to heat the thermally deformable layer, so that the thermally deformable layer is in the molten state.

* * * * *